United States Patent
Ameti et al.

(10) Patent No.: US 8,705,671 B2
(45) Date of Patent: Apr. 22, 2014

(54) METHOD AND APPARATUS FOR PERFORMING TEMPERATURE COMPENSATION

(75) Inventors: Aitan Ameti, Rockville, MD (US); Edward A. Richley, Gaithersburg, MD (US)

(73) Assignee: Zebra Enterprise Solutions Corp., Oakland, CA (US)

( * ) Notice: Subject to any disclaimer, the term of this patent is extended or adjusted under 35 U.S.C. 154(b) by 353 days.

(21) Appl. No.: 13/184,172

(22) Filed: Jul. 15, 2011

(65) Prior Publication Data

US 2012/0014484 A1 Jan. 19, 2012

Related U.S. Application Data

(60) Provisional application No. 61/369,981, filed on Aug. 2, 2010, provisional application No. 61/364,703, filed on Jul. 15, 2010.

(51) Int. Cl.
*H04L 27/08* (2006.01)

(52) U.S. Cl.
USPC .......................................................... 375/345

(58) Field of Classification Search
USPC ............. 375/317, 345–346; 455/127.2, 245.1
See application file for complete search history.

(56) References Cited

U.S. PATENT DOCUMENTS

| | | | |
|---|---|---|---|
| 5,744,939 A * | 4/1998 | Leppo | 320/153 |
| 7,668,523 B2 * | 2/2010 | Adams et al. | 455/245.2 |
| 8,121,221 B2 * | 2/2012 | Kuo et al. | 375/316 |
| 8,447,249 B1 * | 5/2013 | Lu et al. | 455/127.2 |
| 2004/0062208 A1 | 4/2004 | Brown et al. | |
| 2009/0027127 A1 * | 1/2009 | Muhammad et al. | 330/278 |
| 2009/0119558 A1 | 5/2009 | Whetsel | |
| 2009/0315685 A1 | 12/2009 | Bauchot | |

FOREIGN PATENT DOCUMENTS

| | | |
|---|---|---|
| WO | WO 2005/031383 A1 | 4/2005 |
| WO | WO 2007/106972 A1 | 9/2007 |

OTHER PUBLICATIONS

Invitation to Pay Additional Fees and Partial International Search Report from International Application No. PCT/US2011/044243, mailed Dec. 28, 2011.
*Inverse*, [online][retrieved Apr. 29, 2013] Retrieved from the Internet: <URL: http://www.thefreedictionary.com/p/inversely > p. 1.
Mills, A., *Manchester Encoding Using RS232*, Rev 2.0. (2005) pp. 1-5.
International Search Report and Written Opinion for Application No. PCT/US1011/044243 dated Mar. 20, 2012.
ZigBee, Wikipedia, the free encyclopedia, Jun. 5, 2010 [online] [retrieved Aug. 28, 2012]. Retrieved from the Internet: <URL: http://en.wikipedia.org/w/index.php?title=ZigBee&oldid=366129285>. 6 pages.

* cited by examiner

*Primary Examiner* — Khanh C Tran
(74) *Attorney, Agent, or Firm* — Alston & Bird LLP

(57) ABSTRACT

Various methods for performing amplifier gain compensation to correct for variations in temperature are provided. One example method includes modifying a gain adjustment value based on a current temperature reading, receiving a signal, applying a gain adjustment to the signal based on the gain adjustment value, comparing the gain adjusted signal to a plurality of thresholds to generate respective comparison outputs, and selecting one of the comparison outputs for use in determining content and timing information of the received signal. Related systems and apparatuses are also provided.

20 Claims, 10 Drawing Sheets

METHOD AND APPARATUS FOR PERFORMING TEMPERATURE COMPENSATION

CROSS-REFERENCE TO RELATED APPLICATIONS

The present application claims priority to U.S. Provisional Application No. 61/369,981 filed Aug. 2, 2010 entitled "Method and Apparatus for Determining System Node Positions and Performing Temperature Compensation." The present application also claims priority to U.S. Provisional Application No. 61/364,703 filed Jul. 15, 2010 entitled "DART Ultra Wideband (UWB)." The contents of Application No. 61/369,981 and Application No. 61/364,703 are incorporated by reference herein in their entirety.

TECHNICAL FIELD

Embodiments of the present invention relate generally to communications systems, and, more particularly, relate to a method and apparatus for determining system node positions and performing temperature compensation.

BACKGROUND

The presence of communications systems and networks within our working and social environments continues to increase as more and more communications and network-based applications are developed that rely upon networks to implement their functionality. State-of-the-art communications systems and networks can therefore be leveraged to provide a foundation for the construction and implementation of any number of functions and applications. In some instances, the setup and maintenance of these communications networks can involve the need to identify the positions of equipment in the system, for example, for mapping and troubleshooting purposes. Additionally, during setup of some communications networks, the position of the nodes can be useful for configuring the nodes for operation within the system or network.

SUMMARY

Various methods for performing amplifier gain compensation to correct for variations in temperature are provided. One example method includes modifying a gain adjustment value based on a current temperature reading, receiving a signal, applying a gain adjustment to the signal based on the gain adjustment value, comparing the gain adjusted signal to a plurality of thresholds to generate respective comparison outputs, and selecting one of the comparison outputs for use in determining content and timing information of the received signal.

Another example embodiment is an apparatus including processing circuitry configured to control the apparatus to modify a gain adjustment value based on a current temperature reading, receive a signal, apply a gain adjustment to the signal based on the gain adjustment value, compare the gain adjusted signal to a plurality of thresholds to generate respective comparison outputs, and select one of the comparison outputs for use in determining content and timing information of the received signal.

Another example embodiment is a computer readable medium having computer program code stored thereon, the computer program code being configured to, when executed, cause and apparatus to modify a gain adjustment value based on a current temperature reading, receive a signal, apply a gain adjustment to the signal based on the gain adjustment value, compare the gain adjusted signal to a plurality of thresholds to generate respective comparison outputs, and select one of the comparison outputs for use in determining content and timing information of the received signal.

In yet another example embodiment, an apparatus is provided. The apparatus may include means for modifying a gain adjustment value based on a current temperature reading, means for receiving a signal, means for applying a gain adjustment to the signal based on the gain adjustment value, means for comparing the gain adjusted signal to a plurality of thresholds to generate respective comparison outputs, and means for selecting one of the comparison outputs for use in determining content and timing information of the received signal.

BRIEF DESCRIPTION OF THE DRAWING(S)

Reference will now be made to the accompanying drawings, which are not necessarily drawn to scale, and wherein.

DETAILED DESCRIPTION

Figure 1:
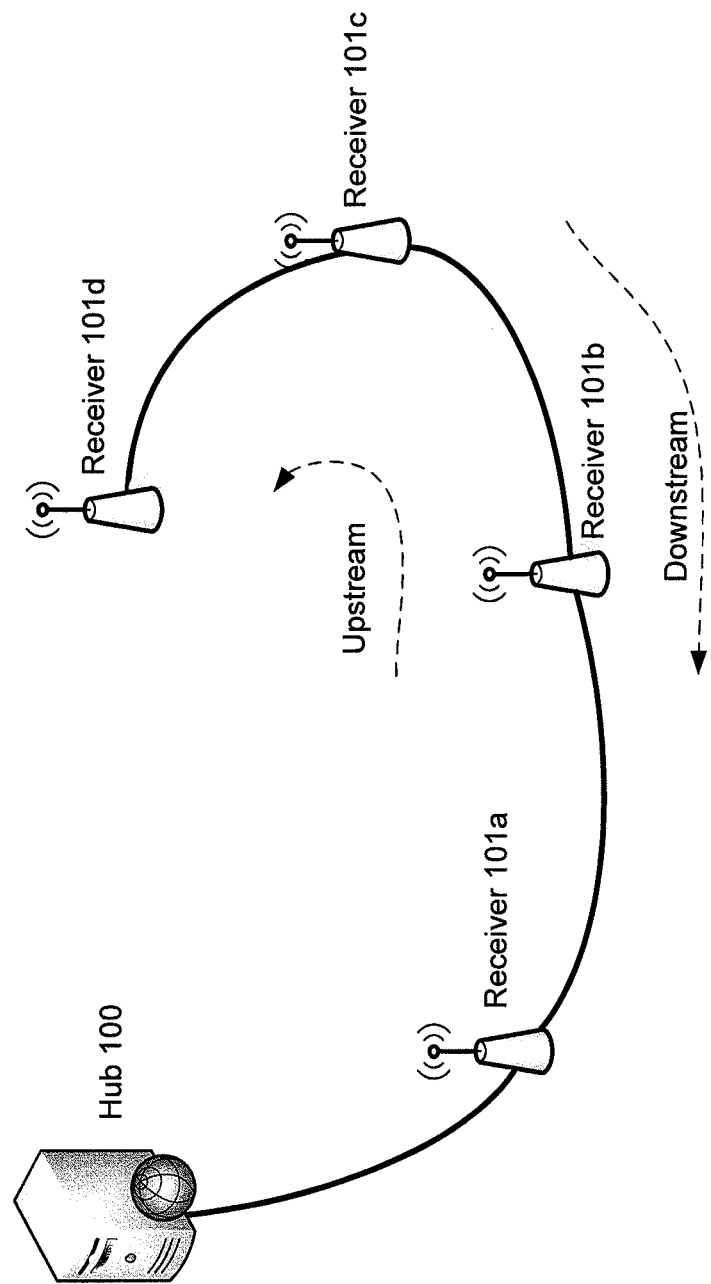
FIG. 1 illustrates an example communications network with a hub and multiple receivers according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

Some example embodiments of the present invention provide for determining the positions of nodes within a communications system. FIG. 1 illustrates an example communications system that may benefit from various example embodiments of the present invention. The system of FIG. 1 includes a hub 100 and a number of receivers 101 (i.e., receivers 101a-101d). While the example embodiments depicted in FIG. 1 involve receivers, it is contemplated that any type of network node (e.g., receivers, servers, routers, etc.) may be utilized in accordance with various example embodiments. As such, while the following example embodiments are described with respect to receivers of an asset locating system as the nodes, example embodiments of the present invention are not limited to such example embodiments.

The receivers 101 may be nodes of an asset locating system, such as a real-time locating system (RTLS). In some example embodiments, the receivers 101 may be UWB (ultra wide band) receivers. A receiver 101 may be configured to, for example, receive signals from a tag affixed to an asset, and facilitate the determining of a location of the tag based at least on signals received at the receiver. In this regard, triangulation, received signal strength, time difference of arrival, and other techniques can be used by the receivers 101 or the hub 100 to determine the location of the tag and the affixed asset.

The receivers 101 may be in communication with each other and the hub 100. In some example embodiments, the receivers 101 may be members of a series string of communications connections (e.g., daisy-chained) to the hub 100, as depicted in FIG. 1. While the communications connections depicted in FIG. 1 are wired connections (e.g., CAT-5 cable connections), according to some example embodiments, the series string may be implemented in a wireless system. The connections may be made in either a proprietary manner or according to industry standards which are established from time to time, such as, for example, G.hn, Zigbee, WirelessHART, mobile ad hoc networks, IEEE 802.11s, or the like. These may be full mesh or partial mesh networks.

To communicate with each other and hub 100, the receivers 101 may be configured to relay messages to adjacent receivers 101 or the hub 100. For example, if receiver 101b sends a message to the hub 100, the message may first be received by the receiver 101a, and the receiver 101a may then relay the message to the hub 100. The messages may be communicated via a signaling scheme, such as, for example, with a bi-phase modulated signal. The receivers and the hub may be configured to convert, for example, to and from ASCII characters in an RS232 format to a bi-phase modulated signal for transmission and reception, respectively.

A bi-phase modulated signal may indicate a logical "1" by a high signal for half of a period, followed by a low signal for the second half of the period. On the other hand, a logical "0" may be indicated by a low signal for half of a period, followed by a high signal for the second half of the period. To indicate a start of a message, an illegal code (e.g., an illegal Manchester code) may be used. In this regard, the illegal code may be indicated by a high signal for three consecutive half periods, or a low signal for three consecutive half periods, followed by the code for a logical "1". Further, according to various example embodiments, messages, such as an attribute information message that may be used to configure the system, need not have a fixed or predictable length. As such, in these example embodiments, the end of a message may be marked by another illegal code (e.g., a Manchester code) to indicate the end of the message.

The hub 100 may be embodied as a server, a computer, or the like. The hub 100 may be configured to determine the positions of the receivers in the network as further described below. In this regard, the hub 100 may be configured to perform or initiate various setup and system installation activities. The hub 100 may also be configured to support various functionalities including, but not limited to, asset locating. In this regard, for example, the hub 100 may be configured to receive representations of a signal received by various receivers from a tag, and analyze the representations to determine a physical location of the tag.

While the hub 100 is depicted in FIG. 1 as being connected to a single series string of receivers 101, it is contemplated that the hub 100 may be connected to multiple series strings of the receivers. In this regard, the multiple series strings of receivers may form a star-pattern of connections, where the hub 100 is positioned central to the star. The hub 100 may therefore be configured to determine from which and distinguish between messages received from each series string of receivers. The hub 100 may also be connected to other networks or other hubs.

Figure 2:
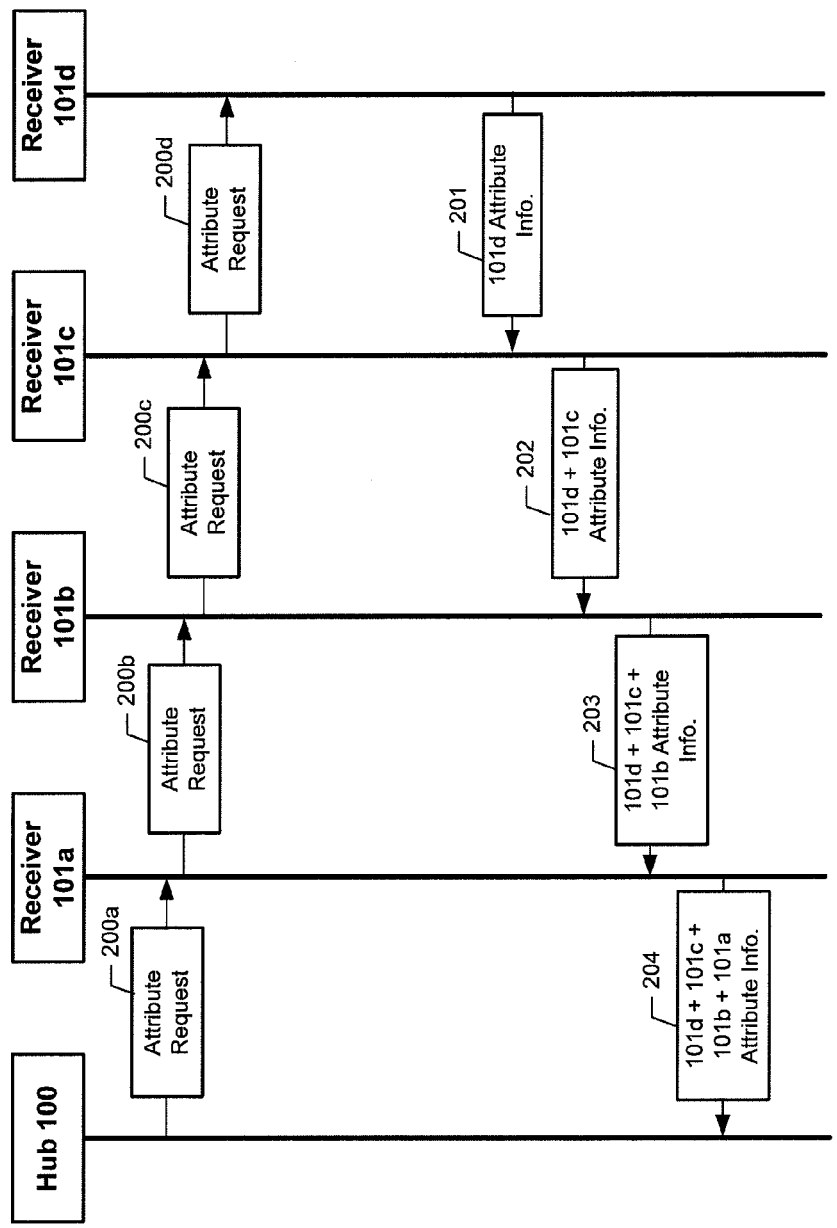
FIG. 2 illustrates an example communications sequence for receiving an attribute information message according to an example embodiment of the present invention.

As mentioned above, the hub 100, according to various example embodiments, may be configured to determine the positions of the receivers 101 on a series string of receivers. To do so, the hub 100 may be configured to initiate a process to determine the positions of the receivers 101 by issuing or sending an attribute request to the receivers 101. According to various example embodiments, the attribute request may be a signal associated with the characters LN<cr>. That is, the attribute request may be an ASCII "L", followed by an ASCII "N", followed by a carriage return (i.e., hexadecimal symbol 0D). FIG. 2 illustrates a signaling diagram where an attribute request 200a is sent by the hub 100. In the system configuration as described with respect to FIG. 1, the attribute request 200a is received by the receiver 101a and relayed to the receiver 101b. In this regard, the receivers may be configured to anticipate (possibly via the setting of a flag or other storage of related data) that a response to the attribute request is forthcoming in the form of an attribute information message upon receipt and relaying of the attribute request to upstream receivers. The receiver 101b, in turn, relays the attribute request 200c to next upstream receiver, i.e., receiver 101c. Receiver 101c then relays the attribute request 200d to receiver 101d. In this regard, the receivers 101 may be configured to relay a message formatted as an attribute request to the next upstream receiver. The receivers may also be configured to detect a signal or connection on their upstream communications ports to determine whether or not they are the last receiver in the series string. As such, since receiver 101d would not detect a signal or connection to its upstream port (since receiver 101d is the last receiver in the series string), receiver 101d, as well as the other receives, can be configured to determine when they are the last receiver in the series string. In response to at least determining that it is the last receiver on the series string, receiver 101d may be configured to initiate a response to the attribute request based on the determination that it is the last receiver in the series string.

Figure 3:
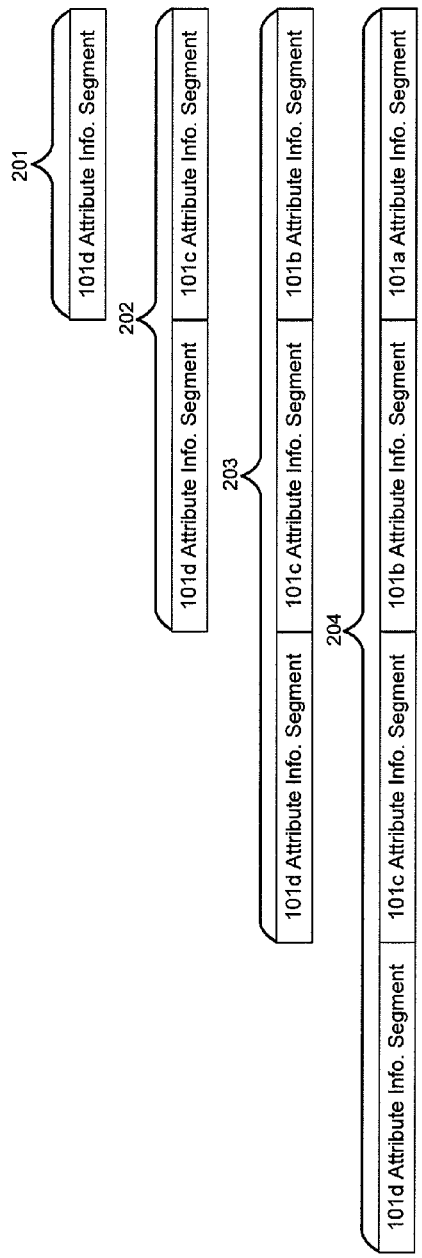
FIG. 3 illustrates various attribute information messages according to an example embodiment of the present invention.

In this regard, receiver 101d may be configured to compile various pieces of attribute information about the receiver 101d, generate an attribute information segment for the receiver 101d. As the last receiver in the series string, the receiver 101d may be configured to generate a shell attribute information message, and add its attribute information segment to the attribute information message. The attribute information message 201, with receiver 101d's attribute information segment, may then be transmitted to the receiver 101c. FIG. 3 illustrates a diagram of the attribute information message 201 that is transmitted to receiver 101c. In turn, receiver 101c, upon determining that the attribute information message 201 is a response to the earlier received attribute request, may be configured to generate an attribute information segment for the receiver 101c and add its segment to the attribute information message. In some example embodiments, the receivers may be configured to simply add their respective attribute information segment to the attribute information message, without performing any decoding of the received attribute information message. The attribute information message 202 may then be transmitted to the receiver 101b. FIG. 3 illustrates a diagram of the attribute information message 202 that is transmitted to receiver 101c, which now includes both the attribute information segment associated with receiver 101d and the attribute information segment associated with receiver 101c. In turn, receiver 101b, upon determining that the attribute information message 202 is a response to the earlier received attribute request, may be configured to generate an attribute information segment for the receiver 101b and add the segment to the attribute information message. The attribute information message 203 may then be transmitted to the receiver 101a. FIG. 3 illustrates a diagram of the attribute information message 203 that is transmitted to receiver 101a, which now includes the attribute information segment associated with receiver 101d, the attribute information segment associated with receiver 101c, and the attribute information segment associated with receiver 101b. In turn, receiver 101a, upon determining that the attribute information message 203 is a response to the earlier received attribute request, may be configured to generate an attribute information segment for the receiver 101a and add its segment to the attribute information message. The attribute information message 204 may then be transmitted from the receiver 101a to the hub 100. FIG. 3 illustrates a diagram of the attribute information message 204 that is transmitted to the hub 100, which now includes the attribute information segment associated with receiver 101d, the attribute information segment associated with receiver 101c, the attribute information segment associated with receiver 101b, and the attribute information segment associated with receiver 101a.

As indicated in the sequence of attribute information messages depicted in FIG. 3, the receivers 101 may be configured to append an attribute information segment to the end of the attribute information message before sending the message to the next downstream entity (e.g., node or hub). Alternatively, according to various example embodiments, the receivers 101 may be configured to add their respective attribute information segment to the attribute information message in a number of ways. For example, the attribute information segments may be added to the beginning of the attribute information message. In some example embodiments, the attribute information segments may be added to the attribute information message by decomposing the attribute information segment to be added, and interleave portions of data or bits in a manner that the data may be regenerated by a receiving entity. Regardless of the technique used for adding the attribute information segment to the attribute information message, the attribute information segment may be added such that the position of the attribute information segment within the attribute information message can be used to determine the position of an associated receiver within the series string of receivers. In some example embodiments, the attribute information message may be encrypted, and the receivers 101 may be configured to decrypt the received attribute information message prior to adding the attribute information segment and re-encrypting the attribute information message for transmission. In other example embodiments, the receivers 101 may be configured to encrypt an attribute information segment and add the encrypted segment to a received and encrypted attribute information message.

In this regard, the position of the receivers may be determined based on at least the ordering of the attribute information segments in the attribute information message. Upon receipt of the attribute information message, the hub 100 may be configured to make this determination. For example, the hub 100 may be configured to utilize an inverse ordering rule to determine the positions of the receivers. In this regard, referring to the attribute information message 204 depicted in FIG. 3, the hub 100 may be configured to determine that receiver 101d is the last receiver in the series string of receivers because the attribute information segment for receiver 101d is positioned as the first attribute information segment. Similarly, the hub 100 may determine that receiver 101c is positioned as the second to the last receiver in the series string of receivers because the attribute information segment for receiver 101c is positioned as the second attribute information segment. Further, the hub 100 may determine that receiver 101b is positioned as the third to the last receiver in the series string of receivers because the attribute information segment for receiver 101b is positioned as the third attribute information segment. And finally, the hub 100 may determine that receiver 101a is positioned as the fourth to the last receiver in the series string of receivers because the attribute information segment for receiver 101b is positioned as the third attribute information segment. The hub 100 may similarly determine that receiver 101a is positioned as the first receiver from the hub 100 in the series string of receivers because the attribute information segment for receiver 101a is positioned as the last attribute information segment. In this regard, the hub 100 may alternatively, or additionally, be configured to analyze the attribute information from the end to the beginning to determine the positions of the receivers.

Thus, based at least on the positions of the attribute information segments in the attribute information message, the hub 100 may be able to determine the position of the receivers within the series string. The hub 100 may be able to determine the positions of the receivers without any prior knowledge of the configuration of the system or the number of receivers in a series string. With the positioning information, the hub 100 may be configured to generate a system schematic or map indicating the positions of the receivers. In some example embodiments, the hub 100 may include a display, and the hub 100 may be configured to generate and/or present a map, schematic, or other depiction of the system configuration including the positions of the receivers on a graphical user interface. Various pieces of attribute information (e.g., telemetry data, diagnostic data, configuration data, etc.) extracted from the attribute information segments may also be presented on a graphical user interface and/or rendered for printing. In this manner, an architecture of the system may be determined and output for use by, for example, system operator or a service technician.

According to various example embodiments, being able to reliably determine the position and ordering of the receivers can avoid errors that can occur when the system configuration is not known. In some installations, it may be difficult to determine the configuration of the system because of multiple wiring options for the receivers (e.g., access to a number of series strings) may be available, making the reliable determination of the positions of the receivers difficult. Through the implementation of various example embodiments, a planned installation scheme can be automatically confirmed, which can avoid errors, and associated troubleshooting, that can occur when a system is improperly determined.

Figure 4:
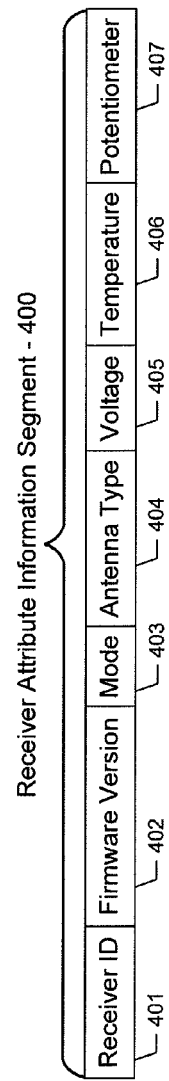
FIG. 4 illustrates an attribute information segment according to another example embodiment of the present invention.

FIG. 4 illustrates the contents of an example receiver attribute information segment 400 according to various example embodiments. In this regard, the example attribute information segment 400 includes fields for various node (or receiver) attributes. The fields for the attributes may include fields for a receiver ID 401 (or node ID), a firmware version 402, a mode 403, an antenna type 404, a voltage 405, a temperature 406, and a potentiometer value 407. The receiver ID 401 may be a unique identifier for the receiver and may be used to address the receiver (or node). The firmware version 402 may indicate the current version of the firmware being implemented or stored on the receiver. The mode 403 may indicate a current mode of operation for the receiver (e.g., factory default, installation mode, operations mode, or diagnostics). In some example embodiments, the mode may indicate whether the receiver is configured to utilize a CRC (cyclic redundancy check) for communications, or the mode may indicate that the data of the communication are encoded in a particular fashion, such as using a binary or ASCII based encoding. The antenna type 404 may indicate the type of antenna used by the receiver, for example, for receiving locating signals from tags. In this regard, the antenna type may indicate that the antenna is internal, external, or a value associated with the antenna's gain or pattern. The voltage 405 may indicate the source voltage to the receiver and/or facilitate the ability to perform voltage measuring as indicated in Table 1. The temperature 406 may be a value that indicates the ambient temperature in the area of the receiver as indicated by, for example, a temperature sensor. The potentiometer value 407 or gain setting may indicate a digital potentiometer value for an attenuator setting. Additional or alternative attribute fields may include media access control (MAC) address, region or country identifier, hardware configuration, agency certifications, date of manufacture, date of installation, clock speed, time, time difference, or the like. Table 1 provides additional detail for the example content of an attribute information segment. While the Table 1 describes the fields in terms of hexadecimal characters, it is contemplated that other conventions may be used such as ASCII, Unicode, or XML.

Based on the forgoing description and the content of Table 1, an example attribute information segment can be defined for a receiver (e.g., in ASCII characters) where the receiver ID is 00000004, the firmware version is 04, the mode is 06, the antenna type is 01, the temperature value is 17, the voltage is DE, and the potentiometer value is FE. Given these attributes, the attribute information segment would be >00000004W04M06A01T17VDEPFE. If the receiver having the ID of 00000004 is the last receiver in the series string of receivers, >00000004W04M06A01T17VDEPFE would also be the content of the attribute information message sent by receiver 00000004 to the next downstream receiver. Further, if a receiver 00000005 is connected between the receiver 00000004 and the hub, the attribute information message sent by receiver 00000005 towards the hub could include an attribute information segment for receiver 00000005, which may result in the attribute information message being >00000004W04M06A01T17VDEPFE>00000005W01M06A01T18VDEPFF. As such, if additional receivers are in between the receiver 00000005 and the hub the attribute information message, those receivers may add their respective attribute information segments to the attribute information message, thereby increasing the length of the attribute information message. Accordingly, the attribute information need not be a fixed length, but rather the length of the attribute information message may be a function of the number of receivers in a series string and/or the number and type of fields that are included in the segments.

Figure 5:
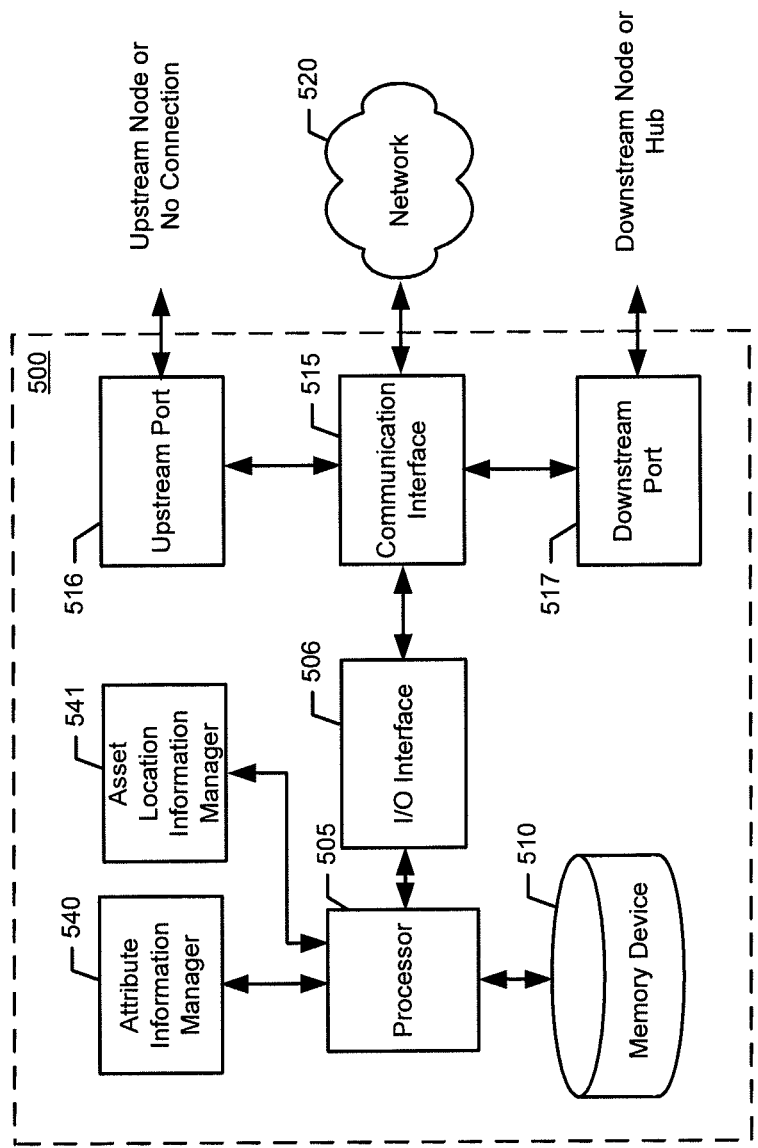
FIG. 5 illustrates a block diagram of a node apparatus and associated system for facilitating the determination of node positions according to an example embodiment of the present invention.
Figure 6:
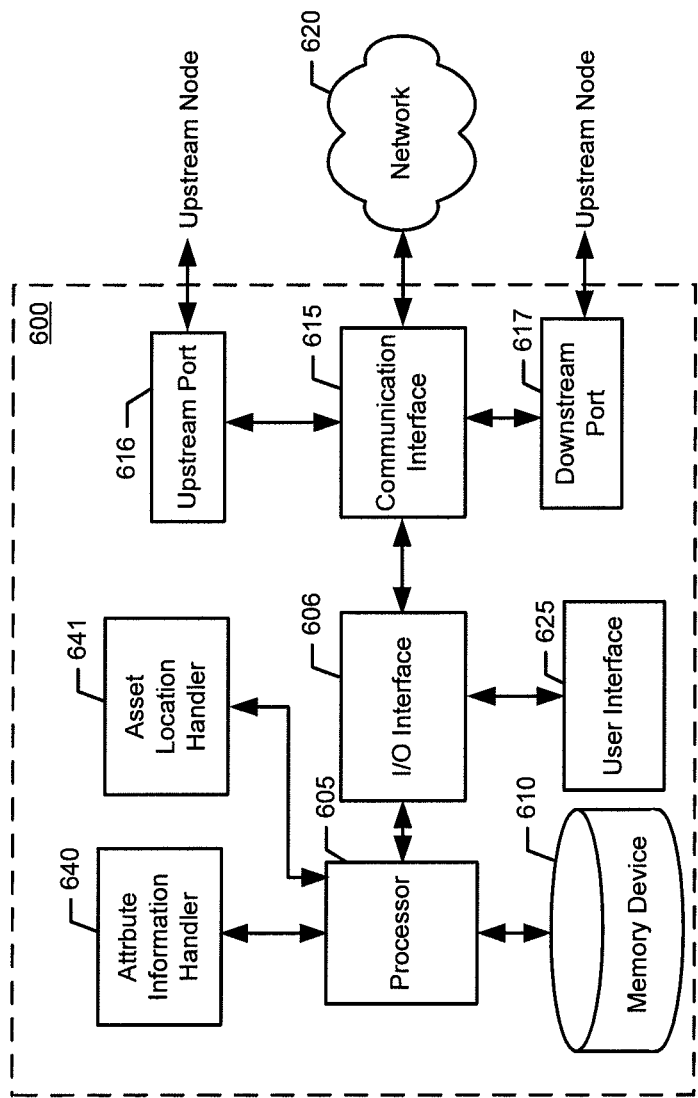
FIG. 6 illustrates a block diagram of a hub apparatus and associated system for facilitating the determination of node positions according to an example embodiment of the present invention.
Figure 7:
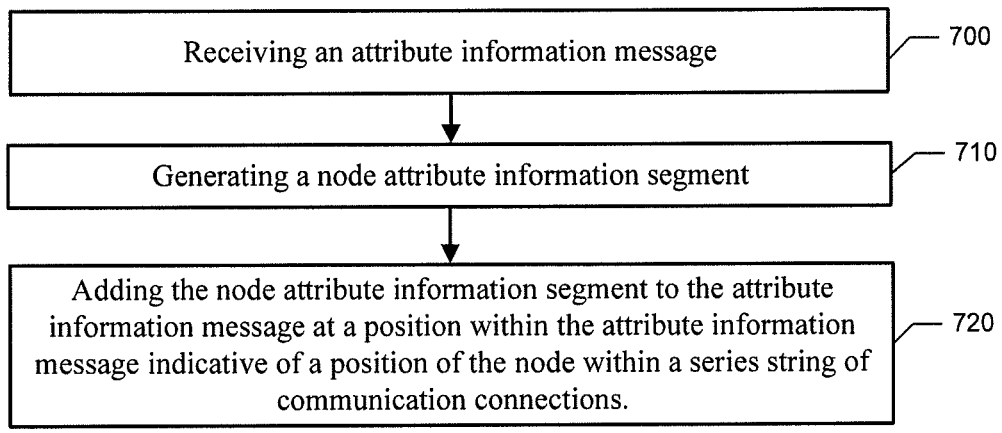
FIG. 7 is a flowchart of an example method for facilitating the determination of node positions from the perspective of a node according to an example embodiment of the present invention.
Figure 8:
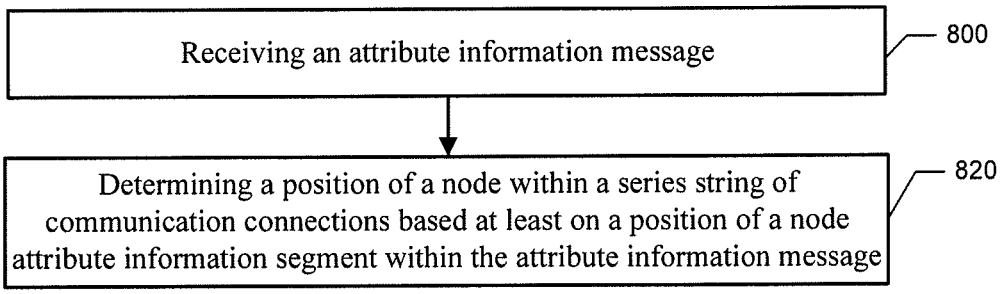
FIG. 8 is a flowchart of an example method for facilitating the determination of node positions from the perspective of a hub according to an example embodiment of the present invention.

The description provided above and generally herein illustrates example methods, example apparatuses, and example computer program products for determining system node positions. FIGS. 5 and 6 depict example apparatuses that are configured to perform various functionalities as described herein. FIG. 5 illustrates an example embodiment of a node (e.g., a receiver). In some example embodiments, the apparatus may therefore be configured to operate in accordance with the functionality described with respect to the receivers 101. FIG. 6 illustrates an example embodiment in the form of an apparatus 600, which may be configured to operate in accordance with the functionality of a hub as described herein. FIGS. 7 and 8 are flowcharts of example methods of the present invention. The flowchart of FIG. 7 describes an example method that may be implemented from the perspective of a node, and the flowchart of FIG. 8 describes an example method that may be implemented from the perspective of the hub.

TABLE 1

| Field Indicator | Field Length | Field Name | Field Characteristics |
| --- | --- | --- | --- |
| ">" | 8 Hexadecimal Characters | Receiver/Unit ID | Representing 4 bytes |
| "W" | 2 Hexadecimal Characters | Firmware Version | FPGA firmware version fixed from firmware |
| "M" | 2 Hexadecimal Characters | Mode of Operation | From Report mode register |
| "A" | 2 Hexadecimal Characters | Antenna type | antenna types are the 5 least significant bits; (01 = High Gain; 02 = Mid Gain; 03 = Omni; 04 = bulk Head) |
| "T" | 2 Hexadecimal Characters | Temperature | degrees in Celsius in 2's complement (... FE = −2 C.; FF = −1 C.; 00 = 0 C.; 01 = +1 C. ...) |
| "V" | 2 Hexadecimal Characters | Voltage | Unit 48 volt input; Range 00 to FF (00 = 0 volts ... FF = 53 volts) divider network (30.1/30.1 + 453) = 301.1/483.1 = 0.0623 ratio of input voltage to input voltage at the ADC FF value at the ADC is 3.3 volts (power supply) actual voltage into divider is 3.3*483.1/30.1 = 52.96~53 v |
| "P" | 2 Hexadecimal Characters | Potentiometer | Digital Potentiometer - value at attenuator |

Referring now to FIG. 5, an example embodiment of the present invention is depicted as apparatus 500. Apparatus 500 may, be embodied as, or included as a component of, a communications device with wired and/or wireless communications capabilities. The apparatus 500 may be embodied as any number of communications and computing devices such as, for example, a receiver as described above, a server, a computer, an access point, a communications switching device, a handheld wireless device (e.g., telephone, portable digital assistant (PDA), mobile television, gaming device, camera, video recorder, audio/video player, radio, digital book reader, and/or a global positioning system (GPS) device), a printer, any combination of the aforementioned, or the like. Regardless of the type of communications device, apparatus 500 may also include computing capabilities.

The example apparatus 500 may include or be otherwise in communication with a processor 505, a memory device 510, an Input/Output (I/O) interface 506, a communications interface 515 with an upstream port 516 and a downstream port 517, an attribute information manager 540, and, in some example embodiments, an asset location information manager 541. The processor 505, which also may be referred to as processing circuitry, may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes the apparatus 500 to perform the various functionalities described herein.

Whether configured as hardware or via instructions stored on a computer-readable storage medium, or by a combination thereof, the processor 505 may be an entity capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a receiver) configured for employing example embodiments of the present invention by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 includes Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505.

Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 could be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention. In some example embodiments, the apparatus 500 may be embodied as a single chip or chipset.

The communication interface 515 may be any device or means embodied in hardware, a computer program product, or a combination of hardware and a computer program that is configured to receive and/or transmit data from/to a network 520 and/or any other device or module in communication with the example apparatus 500. In some example embodiments, the communication interface 515 may be configured to control or leverage other hardware (e.g., an antenna) to perform communications functionality. The communications interface may be configured to communicate information via any type of wired or wireless connection, and via any type of communications protocol, such as a protocols that may be used in asset locating systems or other protocols based on a bi-phase modulated technique. In this regard, the communications interface 515 may be configured to support device-to-device communications. Processor 505 may also be configured to facilitate communications via the communications interface 515 by, for example, controlling hardware included within the communications interface 515. In this regard, the communication interface 515 may include or operate in conjunction with, for example, communications driver circuitry (e.g., circuitry that supports wired communications via, for example, fiber optic connections), one or more antennas, a transmitter module, a receiver module, a transceiver and/or supporting hardware, including, for example, a processor for enabling communications. Via the communication interface 515, the example apparatus 500 may communicate with various other network entities in a device-to-device fashion and/or via indirect communications via an access point, server, gateway, router, or the like. Through the upstream port 516 and the downstream port 517, the communication interface 517 and the apparatus 500 may be connected in a series string as described with respect to FIGS. 1 and 2.

The attribute information manager 540 and the asset location information manager 541 of example apparatus 500 may be any means or device embodied, partially or wholly, in hardware, a computer program product, a transitory or non-transitory computer readable medium or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the attribute information manager 540 and the asset location information manager 541 as described herein. In an example embodiment, the processor 505 includes, or controls, the attribute information manager 540 and the asset location information manager 541. The attribute information manager 540 and the asset location information manager 541 may be, partially or wholly, embodied as processors similar to, but separate from processor 505. In this regard, the attribute information manager 540 and the asset location information manager 541 may be in communication with the processor 505. In various example embodiments, the attribute information manager 540 and the asset location information manager 541 may, partially or wholly, reside on differing apparatuses such that some or all of the functionality of the attribute information manager 540 and the asset location information manager 541 may be performed by a first apparatus, and the remainder of the functionality of the attribute information manager 540 and the asset location information manager 541 may be performed by one or more other apparatuses.

Further, the apparatus 500 and the processor 505 may be configured to perform the following functionality via the asset location information manager 541. In this regard, the asset location information manager 541 may be configured to cause or direct the processor 505 and/or the apparatus 500 to perform various functionalities with respect to asset locating, such as those described with respect to FIGS. 1-4 and as generally described herein.

For example, the asset location information manager 541 may be configured to receive a signal from an asset tag. The received signal may be captured, digitized, and stored, for example in the memory device 510 for subsequent analysis by the apparatus 500 or another apparatus (e.g., a hub 100). A digitized version of the captured signal may be forwarded, by the asset location information manager 541, to, for example, a hub to determine the location of a tag associated with the captured signal using various signal source locating techniques. As such, according to some example embodiments, the asset location information manager 541 may be configured to capture a wireless signal and forward information about the wireless signal (e.g., to a hub) for use in an analysis to determine a location of a source of the wireless signal.

Further, the apparatus 500 and the processor 505 may be configured to perform the following functionality via the attribute information manager 540. In this regard, the attribute information manager 540 may be configured to cause or direct the processor 505 and/or the apparatus 500 to perform various functionalities, such as those described with respect to FIGS. 1-4 and as generally described herein.

For example, with reference to FIG. 7, the attribute information manager 540 may be configured to receive, at the apparatus 500, an attribute information message from an upstream node within a series string of communications connections at 700. In some example embodiments, the attribute information message may be received in a transmission of a bi-phase modulated signal and transmitted as a bi-phase modulated signal. In this regard, the attribute information message may include an attribute information segment for the upstream node. The apparatus 500 and the upstream node may be members of a series string of communication connections to a hub. The attribute information manager 540 may also be configured to generate an attribute information segment for the apparatus 500, at 710. According to various example embodiments, generation of an attribute information segment may occur before, after, or upon receipt of the attribute information message. According to some example embodiments, the node attribute information segment may be generated based on at least on an attribute describing the node generating the node attribute information segment. Further, the attribute information manager 540 may also be configured to add the generated attribute information segment to the attribute information message at a position indicative of a position of the apparatus 500 within the series string of communication connections. The attribute information message may be defined such that a relative position of each upstream node is determinable from an ordering of node attribute information segments within the attribute information message. According to some example embodiments, the attribute information message may be defined such that a connectivity sequence of nodes within the series string of communications connections is determinable from the attribute information message. The attribute information segment may be added in response to an earlier receipt of an attribute request, possibly from a hub. Additionally or alternatively, according to some example embodiments, adding the node attribute information segment may include adding the node attribute information segment without performing any decoding of the attribute information message. In some example embodiments, the attribute information manager 540 may be configured to transmit or cause transmission of the attribute information message upstream, possibly as a bi-phase modulated signal.

Additionally or alternatively, the attribute information manager 540 may be configured to append the attribute information segment at the end of the attribute information message. Further, the attribute information manager 540, may be alternatively or additionally configured to add the attribute information segment to the attribute information message such that a position of the apparatus 500 within the series string of communication connections is determinable based at least on an order of attribute information segments in the attribute information message. Alternatively or additionally, the attribute information segment may be added to the attribute information message such that a position of the apparatus 500 within the series string of communication connections is determinable based at least on an order of attribute information segments of the attribute information message, wherein the position of the apparatus 500 within the series string of communication connections is inversely related to the position of the generated attribute information segment within the attribute information message. Further, in some example embodiments, the attribute information manager 540 may be alternatively or additionally configured to generate the attribute information segment where the segment includes one or more attribute values indicating a unique identifier of the apparatus 500, a firmware version, a mode of operation, an antenna type, a temperature, or a potentiometer value. Additionally or alternatively, the attribute information manager 540 may be configured to detect the presence or absence of a connection on an upstream communications port to determine whether the node is at an end of the series string of communications connections, and subsequently operate accordingly (e.g., by generating an initial response to an attribute request).

Referring now to FIG. 6, an example embodiment of the present invention is depicted as apparatus 600. Apparatus 600 may, be embodied as, or included as a component of, a communications device with wired and/or wireless communications capabilities. The apparatus 600 may be embodied as any number of communications and computing devices such as, for example, a hub as described above, a server, a computer, an access point, a communications switching device, a hand-held wireless device (e.g., telephone, portable digital assistant (PDA), mobile television, gaming device, camera, video recorder, audio/video player, radio, digital book reader, and/or a global positioning system (GPS) device), any combination of the aforementioned, or the like. Regardless of the type of communications device, apparatus 600 may also include computing capabilities.

The example apparatus 600 may include or be otherwise in communication with a processor 605, a memory device 610, an Input/Output (I/O) interface 606, a communications interface 615 with an upstream port 616 and possibly a downstream port 617, an attribute information handler 640, and, in some example embodiments, an asset location information handler 641. The processor 605, which may also be referred to as processing circuitry, may be embodied as various means for implementing the various functionalities of example embodiments of the present invention including, for example, a microprocessor, a coprocessor, a controller, processing circuitry, a special-purpose integrated circuit such as, for example, an ASIC (application specific integrated circuit), an FPGA (field programmable gate array), or a hardware accelerator, or the like. According to one example embodiment, processor 605 may be representative of a plurality of processors, or one or more multiple core processors, operating in concert. Further, the processor 605 may be comprised of a plurality of transistors, logic gates, a clock (e.g., oscillator), other circuitry, and the like to facilitate performance of the functionality described herein. The processor 605 may, but need not, include one or more accompanying digital signal processors. In some example embodiments, the processor 605 is configured to execute instructions stored in the memory device 610 or instructions otherwise accessible to the processor 605. The processor 605 may be configured to operate such that the processor causes the apparatus 600 to perform the various functionalities described herein.

Whether configured as hardware or via instructions stored on a computer-readable storage medium, or by a combination thereof, the processor 605 may be an entity capable of performing operations according to embodiments of the present invention while configured accordingly. Thus, in example embodiments where the processor 605 is embodied as, or is part of, an ASIC, FPGA, or the like, the processor 605 is specifically configured hardware for conducting the operations described herein. Alternatively, in example embodiments where the processor 605 is embodied as an executor of instructions stored on a computer-readable storage medium, the instructions specifically configure the processor 605 to perform the algorithms and operations described herein. In some example embodiments, the processor 605 is a processor of a specific device (e.g., a hub) configured for employing example embodiments of the present invention by further configuration of the processor 605 via executed instructions for performing the algorithms, methods, and operations described herein.

The memory device 610 may be one or more tangible and/or non-transitory computer-readable storage media that may include volatile and/or non-volatile memory. In some example embodiments, the memory device 610 includes Random Access Memory (RAM) including dynamic and/or static RAM, on-chip or off-chip cache memory, and/or the like. Further, memory device 610 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 610 may include a cache area for temporary storage of data. In this regard, some or all of memory device 610 may be included within the processor 605.

Further, the memory device 610 may be configured to store information, data, applications, computer-readable program code instructions, and/or the like for enabling the processor 605 and the example apparatus 600 to carry out various functions in accordance with example embodiments of the present invention described herein. For example, the memory device 610 could be configured to buffer input data for processing by the processor 605. Additionally, or alternatively, the memory device 610 may be configured to store instructions for execution by the processor 605.

The I/O interface 606 may be any device, circuitry, or means embodied in hardware, software, or a combination of hardware and software that is configured to interface the processor 605 with other circuitry or devices, such as the communications interface 615. In some example embodiments, the processor 605 may interface with the memory 610 via the I/O interface 606. The I/O interface 606 may be configured to convert signals and data into a form that may be interpreted by the processor 605. The I/O interface 606 may also perform buffering of inputs and outputs to support the operation of the processor 605. According to some example embodiments, the processor 605 and the I/O interface 606 may be combined onto a single chip or integrated circuit configured to perform, or cause the apparatus 600 to perform, various functionalities of the present invention. In some example embodiments, the apparatus 600 may be embodied as a single chip or chipset.

The communication interface 615 may be any device or means embodied in hardware, a computer program product, or a combination of hardware and a computer program that is configured to receive and/or transmit data from/to a network 620 and/or any other device or module in communication with the example apparatus 600. In some example embodiments, the communication interface 615 may be configured to control or leverage other hardware (e.g., an antenna) to perform communications functionality. The communications interface may be configured to communicate information via any type of wired or wireless connection, and via any type of communications protocol, such as a protocol that may be used in asset locating systems or other protocols based on a bi-phase modulated technique. In this regard, the communications interface 615 may be configured to support device-to-device communications. Processor 605 may also be configured to facilitate communications via the communications interface 615 by, for example, controlling hardware included within the communications interface 615. In this regard, the communication interface 615 may include or operate in conjunction with, for example, communications driver circuitry (e.g., circuitry that supports wired communications via, for example, fiber optic connections), one or more antennas, a transmitter module, a receiver module, a transceiver and/or supporting hardware, including, for example, a processor for enabling communications. Via the communication interface 615, the example apparatus 600 may communicate with various other network entities in a device-to-device fashion and/or via indirect communications via an access point, server, gateway, router, or the like. Through the upstream port 616, the communication interface 615 and the apparatus 600 may be connected to one or more series strings of nodes (e.g., receivers) as described with respect to FIGS. 1 and 2. In some example embodiments, the downstream port may not be connected to another entity, or may be connected to another hub, possibly through a series string of nodes.

The user interface 625 may be in communication with the processor 605, possibly via the I/O interface 606. The user interface 625 may be configured to receive user input from and/or present output to a user as, for example, audible, visual, mechanical or other output indications. The user interface 625 may include, for example, a keyboard, a mouse, a joystick, a display (e.g., a touch screen display), a microphone, a speaker, a printer, or other input/output mechanisms. Further, the processor 605 may comprise, or be in communication with, user interface circuitry configured to control at least some functions of one or more elements of the user interface. The processor 605 and/or user interface circuitry may be configured to control one or more functions of one or more elements of the user interface through computer program instructions (e.g., software and/or firmware) stored on a memory accessible to the processor 605 (e.g., volatile memory, non-volatile memory, and/or the like). In some example embodiments, the user interface circuitry is configured to facilitate user control of at least some functions of the apparatus 600 through the use of a display and is configured to respond to user inputs. The processor 605 may also comprise, or be in communication with, display circuitry configured to display at least a portion of a user interface, the display and the display circuitry configured to facilitate user control of at least some functions of the apparatus 500.

In some embodiments, a display of the user interface 625 may be directed, by the processor 605, to present a graphical user interface to a user. According to some example embodiments, the processor 605 may direct the display to present a configuration map or schematic of a communications network based on the determined positions of nodes (e.g., receivers). Additionally, the processor 605 may be configured to direct the display to present metrics, telemetry data, other attribute values, or derivatives of attribute values on the display.

The attribute information handler 640 and the asset location handler 641 of example apparatus 600 may be any means or device embodied, partially or wholly, in hardware, a computer program product, a transitory or non-transitory computer readable medium or a combination of hardware and a computer program product, such as processor 605 implementing stored instructions to configure the example apparatus 600, memory device 610 storing executable program code instructions configured to carry out the functions described herein, or a hardware configured processor 605 that is configured to carry out the functions of the attribute information handler 640 and the asset location information handler 641 as described herein. In an example embodiment, the processor 605 includes, or controls, the attribute information handler 640 and the asset location handler 641. The attribute information handler 640 and the asset location handler 641 may be, partially or wholly, embodied as processors similar to, but separate from processor 605. In this regard, the attribute information handler 640 and the asset location handler 641 may be in communication with the processor 605. In various example embodiments, the attribute information handler 640 and the asset location handler 641 may, partially or wholly, reside on differing apparatuses such that some or all of the functionality of the attribute information handler 640 and the asset location handler 641 may be performed by a first apparatus, and the remainder of the functionality of the attribute information handler 640 and the asset location handler 641 may be performed by one or more other apparatuses.

Further, the apparatus 600 and the processor 605 may be configured to perform the following functionality via the asset location handler 641. In this regard, the asset location handler 641 may be configured to cause or direct the processor 605 and/or the apparatus 600 to perform various functionalities with respect to asset locating, such as those described with respect to FIGS. 1-4 and as generally described herein.

For example, the asset location handler 641 may be configured to receive one or more representations of a signal from a tag captured by one or more respective receivers. The asset location handler 641 may be configured to analyze the one or more representations to determine a location of the tag that transmitted the signal. The asset location handler 641 may therefore be configured to support functionality used to implement signal source locating techniques such as angle of arrival, received channel power, time of flight, near-field electromagnetic ranging, triangulation, time difference of arrival, and signal strength analysis.

Further, the apparatus 600 and the processor 605 may be configured to perform the following functionality via the attribute information handler 640. In this regard, the attribute information handler 640 may be configured to cause or direct the processor 605 and/or the apparatus 600 to perform various functionalities, such as those described with respect to FIGS. 1-4 and as generally described herein. For example, with reference to FIG. 8, the attribute information handler 640 may be configured to receive an attribute information message at 800. The attribute information message may comprise at least a first node attribute information segment for a first node and a second node attribute information segment for a second node. Further, the first node and the second node may be members of a series string of communication connections to the apparatus 600. The attribute information handler 640 may also be configured to determine a position of the first node within the series string of communication connections based at least on a position of the first node attribute information segment within the attribute information message at 810. The attribute information handler 640 may also be configured to do the same with additional nodes, including the second node.

Additionally or alternatively, the attribute information handler 640 may be configured to determine the position of the first node within the series string of communication connections based at least on an order in which the first node attribute information segment appears within the attribute information message. Further, according to some example embodiments, the attribute information handler 640 may be configured to determine the position of the first node within the series string of communication connections relative to other nodes and the apparatus 600 within the series string of communication connections based at least on an order in which the first node attribute information segment appears relative to attribute information segments for other nodes within the attribute information message. Additionally or alternatively, determining the position of the first node may include determining the position of the first node within the series string of communication connections relative to other nodes and the hub (e.g., apparatus 600) based at least on an order in which the first node attribute information segment appears relative to attribute information for other nodes within the attribute information message, wherein the position of the first node within the series string of communication connections relative to the other nodes and the hub is inversely related to the position of the first node attribute information segment within the attribute information message relative to attribute information segments for other nodes within the attribute information message. According to some example embodiments, the attribute information handler 640 may be additionally or alternatively configured to determine the position of the first node position of the first node within the series string of communication connections without prior information indicating a number of nodes within the series string of communication connections. In some example embodiments, receiving the attribute information message may additionally or alternatively include receiving the attribute information message comprising the first node attribute information segment, the first node attribute information segment comprising a unique identifier of the first node. Further, in some example embodiments, the attribute information handler 640 may be configured to receive the attribute information message, wherein the attribute information message includes an indicator at a beginning of each attribute information segment. The attribute information handler 640 may additionally or alternatively be configured to receive the attribute information message comprising the first node attribute information segment for the first node, wherein the first node is a receiver in an asset locating system. Additionally or alternatively, the attribute information handler 640 may be configured to receive the attribute information message, wherein a beginning of the attribute information message is indicated by an illegal Manchester code for bi-phase data.

Figure 9:
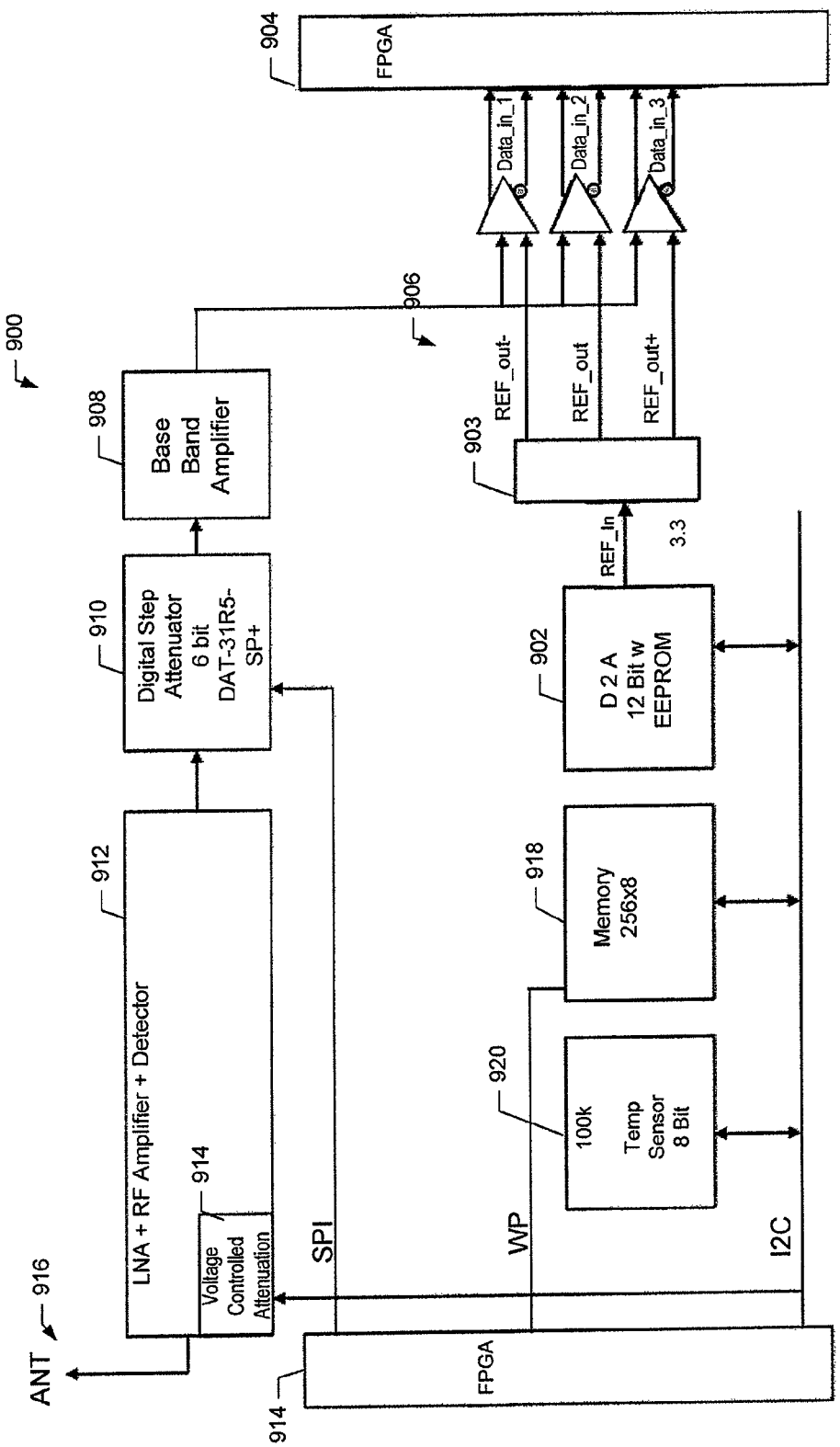
FIG. 9 is a block diagram of an example receiver that includes components configured to support temperature compensation according to various example embodiments.

Having described a node and a node configuration in the form of the apparatus 500 (which may be a receiver as described herein), FIG. 9 illustrates a block diagram of the components of an example receiver 900 that is configured by the FPGAs 904 and 914, to perform the functionality described with respect to the attribute information manager 540 and the asset location information manager 541 of FIG. 5. Additionally, the receiver 900 includes components configured to perform temperature compensation to minimize or eliminate the effects on the receiver's gain due to changes in temperature and maximize the consistency between the handling of received signals (e.g., locating signals from a tag) at disparate temperatures. Temperature compensation as described herein may operate to optimize the result of locating techniques employed by the receiver 900 which may be configured to facilitate locating of signal sources using techniques such as time-of-flight signal analyses or the other locating techniques described herein.

The receiver 900 may include an antenna 916, which may be configured for ultra-wide band reception. The receiver 900 may include an amplifier/detector 912 that may be configured to perform low noise amplification, radio frequency amplification, and signal detection. The amplifier/detector 912 may include a voltage controlled attenuator 914. The receiver 900 may also include a step attenuator, such as, the digital step attenuator 910, and a base band amplifier 908. According to various example embodiments, the receiver 900 may also include a temperature sensor 920, memory device 918, digital-to-analog converter and memory device 902, and a resistor network 903. The memory devices may be volatile or non-volatile. According to some example embodiments, the receiver 900 may also include a plurality of comparators 906.

According to some example embodiments, the receiver 900 may include FPGA's 914 and 904, which, according to some example embodiments, may be referred to as processing circuitry that can include a common processing chip, chipset, which may be referred to as the FPGA 904/914. In this regard, the FPGA 904/914 may be configured to perform the functionality described with respect to the attribute information manager 540 and the asset location information manager 541 of FIG. 5 and my be embodied as processing circuitry such as the processor 505. Additionally, or alternatively, the FPGA 904/914 may be configured to perform and support the performance of the temperature compensation functionality described below.

The signal analysis performed by the receiver 900 and the FPGA 904/914 may be performed without automatic gain control (AGC) because the receiver may be attempting to measure characteristics of a received signal, such as the first arrival of energy from a transmitter (e.g., a tag). In many implementations of AGC, information in a data signal that is important for determining the time of arrival may be lost, and therefore the use some AGC techniques may not be preferred. To measure, for example, the first arrival of energy, the receivers may be configured to operate within a gain threshold that is maintained at a fixed margin above the noise floor. However, changes in temperature may affect the receiver's ability to maintain this fixed margin, and thus may affect the performance of the receiver at particular temperatures. As such, receiver 900 may be configured to maintain the fixed margin over wide changes in temperature to facilitate increased accuracy of performance at a range of temperatures.

In this regard, the receiver 900, which may be a non-coherent UWB receiver, may include one or more radio frequency (RF) amplifier stages, for example in the amplifier/detector 912, providing about 40-50 dB of gain between the antenna 916 and the detector. Filtering may be performed to establish a band of interest that may be inter-staged in the RF amplifier stages. After detection by the detector (e.g., which may be a square-law device) another baseband gain of, for example about 30-50 dB, may be provided before thresholding circuitry (e.g., the memory device and digital-to-analog converter 902, resistor network 903, and the comparators 906) may be used to pass the received pulses into the digital domain. The resistor network 903 may be configured to receive an input and output multiple thresholds based on the input. For example, the resistor network 903 may be configured to generate 3 thresholds that vary form each other by approximate 1 db. The thresholding performed by the thresholding circuitry may be accomplished by one or more comparators 906, which may be high speed comparators.

The receiver 900 can be calibrated, for example, at manufacture time, in order to correct for gain variations between circuit boards and components for the purpose of handling the affects on gain due to device material properties and the like. The calibration may be accomplished by adjusting the threshold applied to a comparator, or set of comparators, 906, through digital-to-analog converter 902, such that some acceptable or threshold number of false alarms from noise are present at manufacturing. Memory 918 can store the calibration value for future application during deployment of the receiver. The offsets between the thresholds supplied to the comparators may be set to any value, such as, for example 1 dB between each threshold. In some example embodiments, the offsets may be non-uniform such that the offset between a first and a second threshold may not be equivalent to the offset between the second and a third threshold.

Due to the relatively high gain associated with the amplifier stages, changes in temperature that affect the gain can be sensed and the change in gain may be compensated for by the receiver 900. In this regard, for example, a receiver 900 may, for example, be installed to operate in a harsh environment where the temperature can range from −40 C to +80 C and even beyond. Amplifiers made of GaAs, Si or SiGe MMICs and transistors can lose gain as temperature rises. For example, a 40-50 dB RF gain stage may lose as much as 6-8 dB between −40 C and +80 C. The baseband component (e.g., the base band amplifier 908) can exhibit similar performance effects.

In order to compensate for temperature variations, the receiver 900 may be configured in accordance with the following. In some example embodiments, the receiver 900 may first be configured to include a step attenuator 910, which may be a digital step attenuator, in the baseband section and as an input to the base band amplifier 908. In some example embodiments, the step attenuator 910 may be in communication with and/or connected to the FPGA 904/914 and, possibly via the FPGA 904/914, the step attenuator 910 may be connected to a temperature sensor 920, which may be configured to sense the temperature of the RF and baseband sections. In this regard, the step attenuator may be controlled by the FPGA 904/914 based on the temperature provided by the temperature sensor 920. In operation, the FPGA 904/914 may be configured to read, possibly periodically, the temperature from the temperature sensor 920, and modify the gain via the step attenuator 910 according to an established gain table determined, for example, at design time. The gain table may be used for nominal temperature correction for receivers and the gain table may be based on a relationship between gain and temperature that presumes the variation to be rather consistent across boards, despite expected variations in absolute gain, since, according to some example embodiments, the variation may be largely determined by device material properties.

According to some example embodiments, the receiver 900 may also be configured to implement multiple (e.g., 3) gain compensation thresholds, each with a different offset relative to each other. The multiple thresholds may be applied to respective comparators 906 to generate multiple streams of digitized pulse outputs. The use of a bank of comparators, rather than a single comparator, accomplishes several objectives. For example, the resistor network 903 may be configured to output 3 thresholds that are, for example, about 1 db apart. The base band signal provided by the base band amplifier 908 may be compared with each of the gain compensation thresholds and the outputs of the comparators may be received by the FPGA 904/914. FPGA 904/914 may be configured to then process each of the comparator outputs to determine which provides an error-free signal or the most error free signal, and the content and timing information of the selected signal may be considered for further analysis. In this regard, the content and timing information may be forwarded, for example, to a hub, to perform the locating analysis of the content and timing information. In this regard, each output of the comparators may be processed independent of each other and the results may be validated independently. Subsequently, the results may be processed to determine which signal was first received or first to arrive (e.g., via a time stamp) and is valid. One output will have more noise, but will be more sensitive than the rest, while one will have less noise but be less sensitive. In this manner, the overall sensitivity of the receiver may be increased since, on average, more packets will be successfully decoded than if a single comparator had been used. Some fraction of those decoded packets will now have come from the more sensitive comparator, increasing the chance of receiving a weak signal and also helping to ensure the earliest portion of the signal is utilized for establishing arrival time.

Further, for example, calibration of the thresholds may be performed at room temperature at manufacture time by considering the noise hits (i.e., false alarms from noise) on one of the multiple threshold channels. For example, the middle reference may be considered for this purpose and its threshold adjusted accordingly to modify the levels of the set of thresholds to generate a more or less sensitive comparator set. Some or all of the multiple threshold channels may be processed by the FPGA 904, and, according to some example embodiments, a selection of the results from the channels may be made. In this regard, for example, the first channel to produce an error-free or acceptable result may be selected for the content and timing information provided by the channel. Accordingly, variations in the actual temperature performance of the receiver, from the nominal, may be accommodated since each of the multiple channels was derived from a slightly different threshold than used for calibration.

For example, in a three-threshold system, one might set channel one to be 1 dB below channel two, and set channel three to be 1 dB above the channel two. When calibration is performed based on the room temperature performance of the channel two, channels one and three may provide some margin in case the overall gain at −40 C isn't exactly what the gain table had assumed, and likewise at +80 C. The result, according to some example embodiments, is a receiver 900 which maintains nearly optimal performance over a wide temperature range. The use of a bank of comparators helps to compensate for inaccuracies in the temperature compensation mechanism.

Figure 10:
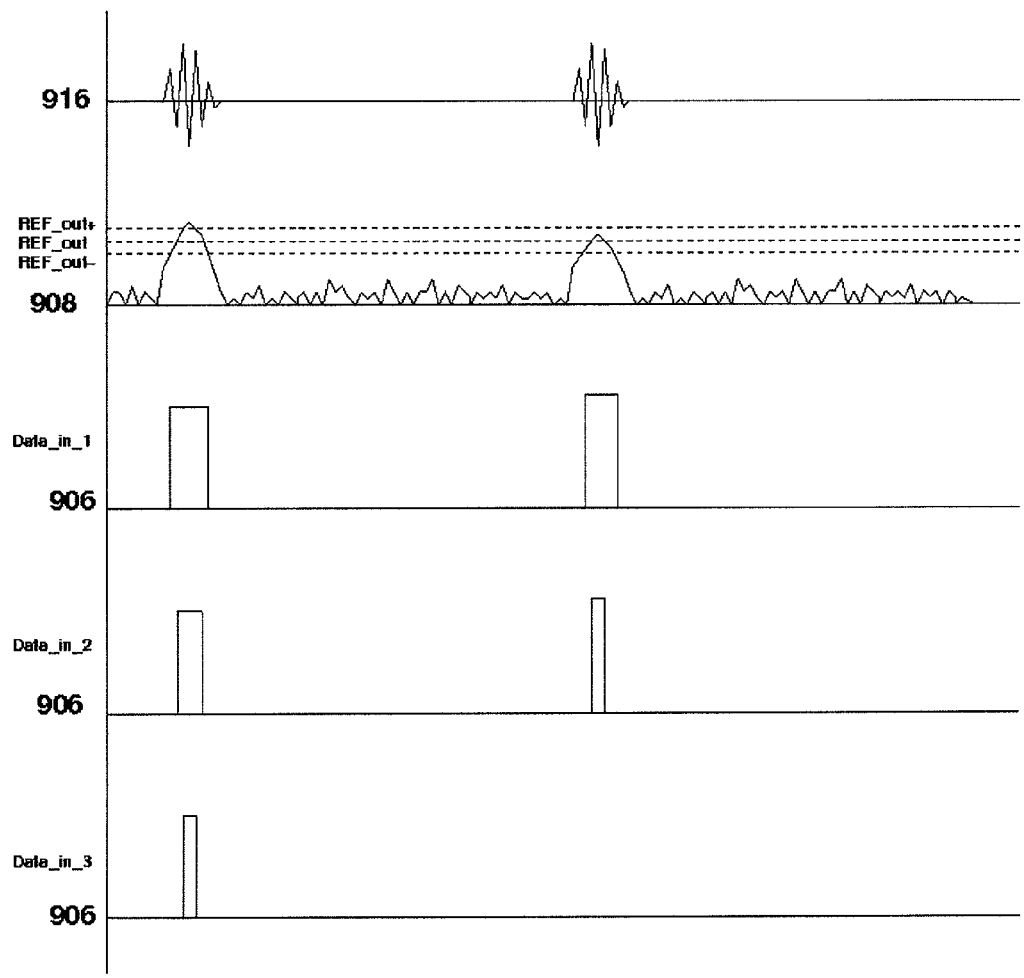
FIG. 10 is an illustration of example signal outputs from various components included in the example receiver illustrated in FIG. 9 according to various example embodiments.

To further describe the use of the comparators and their respective outputs, FIG. 10 is provided which illustrates example signal outputs at various components of the receiver 900. In regard, the signal measured at the output of the antenna is first provided. Second (moving from top to bottom), the signal at the output of the base band amplifier 908 is provided and is depicted relative to the thresholds (REF_out+, REF_out, and REF_out−). The third signal is the output of the first comparator that received the REF_out− threshold (i.e., the signal at Data_in__1). Note that the comparator returns a true, or a high value, when the signal form the base band amplifier exceeds the threshold. The fourth signal is the output of the second comparator that received the REF_out threshold (i.e., the signal at Data_in__2), and finally, the fifth signal is the output of the third comparator that received the REF_out+ threshold (i.e., the signal at Data_in__3).

Figure 11:
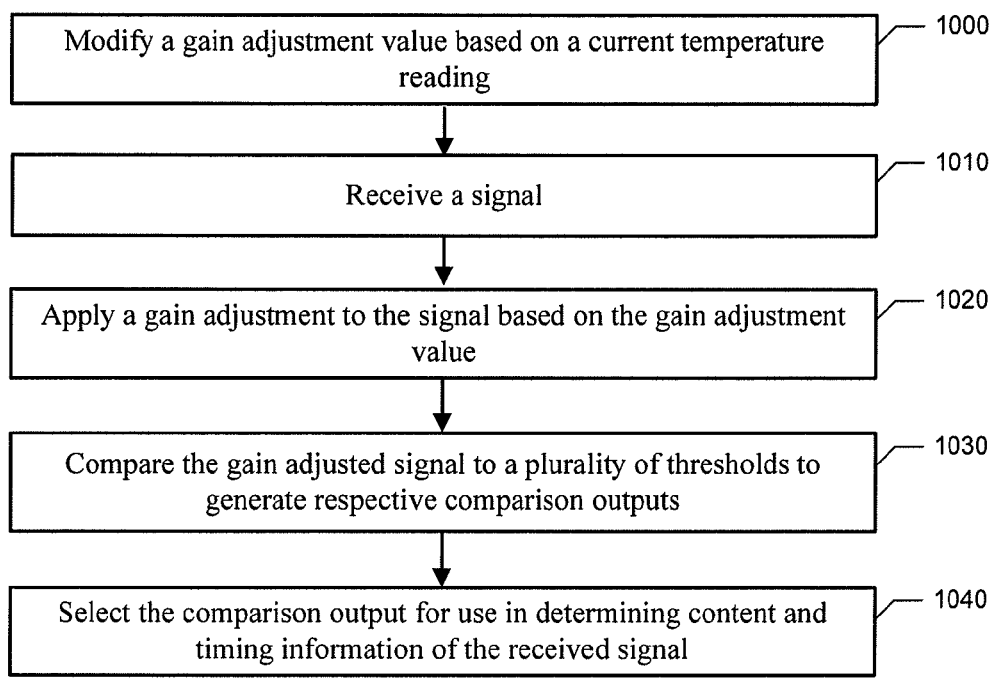
FIG. 11 is a flowchart of an example method for temperature compensation according to an example embodiment of the present invention.

FIG. 11 illustrates a flow chart for temperature compensation according to various example embodiments. The method as described with respect to FIG. 11 may be implemented by the processor 505 of apparatus 500, the FPGA 904/914, or the FPGA 904/914 and associated circuitry of the receiver 900. At 1000, a gain adjustment value of the step attenuator 910 may be modified based on a temperature reading from the temperature sensor 920. A gain compensation table may be used to determine the modified gain adjustment value based on the temperature. According to various example embodiments, a temperature reading may be taken at repeatedly and at regular intervals, and the gain adjustment value may be modified accordingly. At 1010, a signal may be received, for example, from a tag to be located. At 1020, a gain adjustment may be applied to the signal, where the adjustment is based on the current gain adjustment value. At 1030, the gain adjusted signal may be compared to a plurality of thresholds to generate respective comparison outputs. Finally, at 1040, a comparison output may be selected to for use in determining content and timing information of the received signal.

Figure 12:
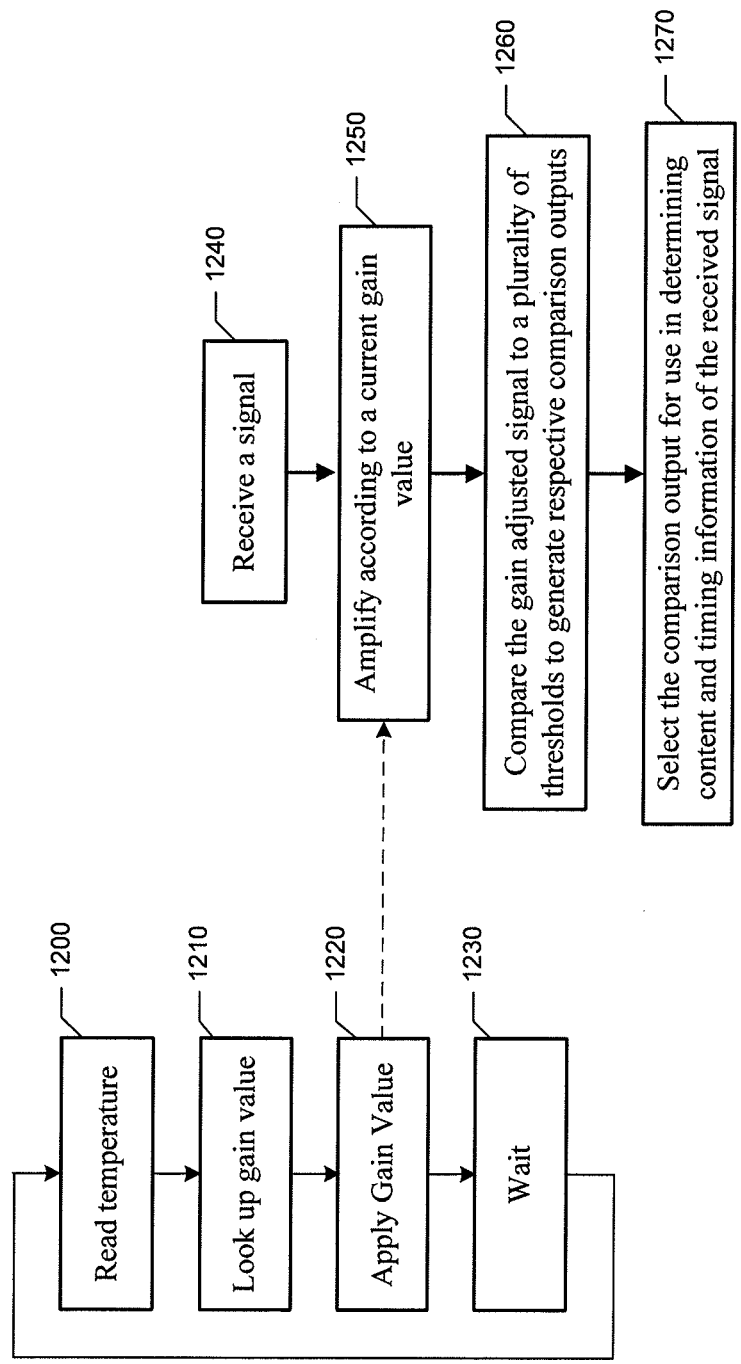
FIG. 12 is another flowchart of an example method for temperature compensation according to an example embodiment of the present invention.

FIG. 12 illustrates another flow chart for temperature compensation according to various example embodiments. The method as described with respect to FIG. 12 may be implemented by the processor 505 of apparatus 500, the FPGA 904/914, or the FPGA 904/914 and associated circuitry of the receiver 900. The temperature compensation technique of FIG. 12 includes the two related processes. The process involving operations 1200, 1210, 1220, and 1230 may run independent of the process involving the operations of 1240, 1250, 1260, and 1270, as further described below.

At 1200, a temperature reading may be taken to determine the current temperature. At 1210, a look up of the gain value may be performed from, for example, the gain table as described above. At 1220, the gain value that had been determined from the table may be applied or stored as the current or latest gain value. According to some example embodiments, after applying the updated gain value, a wait period may be entered before a new temperature reading is taken at 1200.

The gain value that is continuously updated based on the temperature in the process involving 1200, 1210, 1220, and 1230, can be used to amplify a received signal to perform temperature compensation of the signal. In this regard, a signal may be received at 1240. The signal may then be amplified at 1250 based on the gain value that was applied at 1220. After amplifying the signal accordingly, the gain adjusted signal may be compared to a plurality of thresholds to generate respective comparison outputs. Finally, at 1270, a comparison output may be selected for use in determining content and timing information of the received signal.

FIGS. 7, 8, 11 and 12 illustrate flowcharts of example systems, methods, computer program products, and/or transitory or non-transitory computer readable media according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIGS. 7, 8, and 10 and otherwise described herein may be stored on a memory device, such as memory device 510, 610, or memory devices 918 and 902, of an example apparatus, such as example apparatus 500, 600, or FPGA 904/914, and executed by a processor, such as the processor 505, processor 605, or FPGA 904/914. As will be appreciated, any such program code instructions may be loaded onto a computer or other programmable apparatus (e.g., processor 505, 605, FPGA 904/914, memory device 510, 610, memory devices 918, 902, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   modifying a gain adjustment value based on a current temperature reading;
   receiving a signal;
   applying a gain adjustment to the signal based on the gain adjustment value;
   comparing the gain adjusted signal to a plurality of thresholds to generate respective comparison outputs; and
   selecting one of the comparison outputs for use in determining content and timing information of the received signal.

2. The method of claim 1, wherein modifying the gain adjustment value includes modifying the gain adjustment value based on the temperature reading and a gain compensation table.

3. The method of claim 1, wherein modifying the gain adjustment value includes repeatedly reading the temperature provided by a temperature sensor.

4. The method of claim 1, wherein applying the gain adjustment to the signal is performed by a step attenuator.

5. The method of claim 1, wherein comparing the gain adjusted signal to a plurality of thresholds includes generating the plurality of thresholds via a resistor network that receives a calibrated input reference.

6. The method of claim 1, wherein comparing the gain adjusted signal to a plurality of thresholds includes generating the plurality of thresholds, each of the plurality of thresholds being offset from another by a given amount.

7. An apparatus comprising a processor and a memory, the processor and the memory configured to control the apparatus to:
- modify a gain adjustment value based on a current temperature reading;
- receive a signal;
- apply a gain adjustment to the signal based on the gain adjustment value;
- compare the gain adjusted signal to a plurality of thresholds to generate respective comparison outputs; and
- select one of the comparison outputs for use in determining content and timing information of the received signal.

8. The apparatus of claim 7, wherein the processing circuitry configured to modify the gain adjustment value includes being configured to modify the gain adjustment value based on the temperature reading and a gain compensation table.

9. The apparatus of claim 7, wherein the processing circuitry configured to modify the gain adjustment value includes being configured to repeatedly read the temperature provided by a temperature sensor.

10. The apparatus of claim 7, wherein the processing circuitry configured to apply the gain adjustment to the signal is a step attenuator.

11. The apparatus of claim 7, wherein the processing circuitry configured to compare the gain adjusted signal to a plurality of thresholds includes being configured to generate the plurality of thresholds via a resistor network that receives a calibrated input reference.

12. The apparatus of claim 7, wherein the processing circuitry configured to compare the gain adjusted signal to a plurality of thresholds includes being configured to generate the plurality of thresholds, each of the plurality of thresholds being offset from another by a given amount.

13. The apparatus of claim 7, wherein the apparatus is a receiver of an asset locating system.

14. The apparatus of claim 13, wherein the apparatus comprises a temperature sensor configured to sense the temperature at a time of receipt of the signal.

15. A non-transitory computer readable medium having computer program code stored thereon, the computer program code being configured to, when executed, cause an apparatus to:
- modify a gain adjustment value based on a current temperature reading;
- receive a signal;
- apply a gain adjustment to the signal based on the gain adjustment value;
- compare the gain adjusted signal to a plurality of thresholds to generate respective comparison outputs; and
- select one of the comparison outputs for use in determining content and timing information of the received signal.

16. The medium of claim 15, wherein the program code configured to cause the apparatus to modify the gain adjustment value includes being configured to cause the apparatus to modify the gain adjustment value based on the temperature reading and a gain compensation table.

17. The medium of claim 15, wherein the program code configured to cause the apparatus to modify the gain adjustment value includes being configured to cause the apparatus to repeatedly read the temperature provided by a temperature sensor.

18. The medium of claim 15, wherein the program code configured to cause the apparatus to apply the gain adjustment to the signal includes being configured to cause the apparatus to apply the gain adjustment to the signal via a step attenuator.

19. The medium of claim 15, wherein the program code configured to cause the apparatus to compare the gain adjusted signal to a plurality of thresholds includes being configured to cause the apparatus to generate the plurality of thresholds via a resistor network that receives a calibrated input reference.

20. The medium of claim 15, wherein the program code configured to cause the apparatus to compare the gain adjusted signal to a plurality of thresholds includes being configured to cause the apparatus to generate the plurality of thresholds, each of the plurality of thresholds being offset from another by a given amount.

* * * * *